Figure 1:
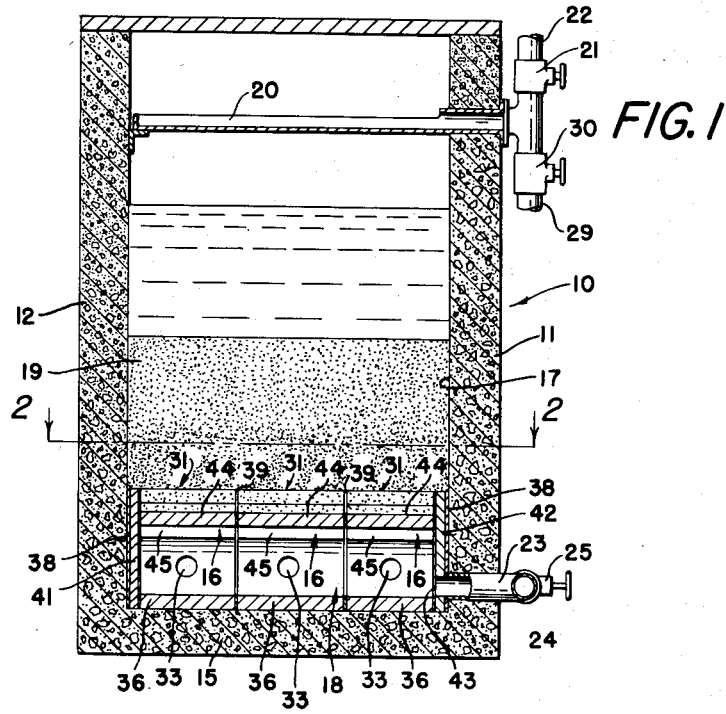

Aug. 30, 1955      E. D. BARSTOW      2,716,490
FILTER CONSTRUCTION

Filed Jan. 24, 1951      4 Sheets-Sheet 1

INVENTOR.
EUGENE D. BARSTOW
BY
ATTORNEYS

Aug. 30, 1955  E. D. BARSTOW  2,716,490
FILTER CONSTRUCTION

Filed Jan. 24, 1951  4 Sheets-Sheet 2

INVENTOR.
EUGENE D. BARSTOW
BY
ATTORNEYS

Aug. 30, 1955  E. D. BARSTOW  2,716,490
FILTER CONSTRUCTION
Filed Jan. 24, 1951  4 Sheets-Sheet 3

INVENTOR.
EUGENE D. BARSTOW
BY
ATTORNEYS

Aug. 30, 1955  E. D. BARSTOW  2,716,490
FILTER CONSTRUCTION
Filed Jan. 24, 1951  4 Sheets-Sheet 4

INVENTOR.
EUGENE D. BARSTOW
BY
ATTORNEYS

United States Patent Office 2,716,490
Patented Aug. 30, 1955

2,716,490

FILTER CONSTRUCTION

Eugene D. Barstow, Cuyahoga Falls, Ohio

Application January 24, 1951, Serial No. 207,602

5 Claims. (Cl. 210—130)

This invention relates to improvements in filter constructions of the type more particularly adapted for the purification of drinking water, sewage, and other liquids.

Heretofore, in the construction of filtration apparatus, it has been customary to provide a tank which is divided into a relatively large upper filter chamber, and a relatively small lower receiving chamber or reservoir, which chambers are separated by a horizontal false bottom, usually formed of a plurality of porous plates joined together to provide a single integral porous structure. This porous false bottom or partition supports a filter bed composed of relatively fine granular material, such as a quartz sand, and the porous plates are rigidly secured in spaced relation to the real bottom of the tank by great numbers of vertical bolts or rods, the lower ends of which are embedded in or otherwise rigidly secured to the real bottom, while the upper ends of these bolts or rods utilize nuts and washers to secure the plates thereto. Water or other fluid to be filtered flows by gravity through the granular filtering medium comprising the filter bed, which separates particles of solid matter from the water, and the filtered water then flows through the porous plates into the reservoir from where it is passed to a suitable supply system. The filter bed gradually becomes clogged with sediment from the water and the rate of filtration decreases until it becomes necessary to clean the filtering medium in order to efficiently operate the filtering process. This cleaning operation is accomplished by stopping the flow of water to be filtered, and then providing a backwash of clean water which enters the reservoir chamber below the porous plates under sufficient pressure and in sufficient volume and velocity to place the filter medium in suspension, and with sufficient turbulence to wash the sediment or foreign matter from the grains of the filter medium. This wash water carrying the sediment or foreign matter rises in the tank until it overflows the lips of a wash water trough which carries away the water and sediment. After the filter bed has been cleaned, the remaining wash water is drained from the tank and its source closed off, so that water to be filtered may again flow through the tank.

In order to clean the filter medium properly it may be necessary to force the wash water through the sand at such a rate that an upward pressure of the order of 10 lbs. per square inch will be created against the under side of the porous plates. This is considerably more pressure than the counteracting pressure from above due to the weight of the filtering medium, and makes it necessary to securely anchor down the porous plates to keep them in place, this being one of the functions of the vertical bolts or rods previously referred to.

In actual use, filtration apparatus which requires the use of these vertical bolts or rods to hold down the porous filter plates frequently has been found to be inadequate, and portions of the plates have broken off under pressure, necessitating replacement with new plates and sometimes requiring replacement of a new complete false bottom. Further, the cost of the non-corrodible bolts, rods, washers and nuts used in this apparatus is relatively high, and so many are required. This cost, and the difficulties encountered in properly locating the bolts or rods so that they precisely fit the plates makes the installation of the plates a difficult and expensive job.

On of the objects of this invention is to provide a filter construction of the general type referred to which does not require the use of any bolts, rods, washers or nuts, in order to secure the porous filter plates in proper position in the apparatus so that pressure from the wash water will have no detrimental effects on the plates.

Another object is to provide one form of filter construction wherein the reservoir or lower chamber of the tank is formed as a self-contained unit that has a bottom and side walls separate and distinct from the regular bottom and side walls of the tank, the porous filter plates being connected to supporting blocks that are an integral part of this self-contained unit, so that when wash water under pressure enters the unit, the supporting blocks anchor the plates against the upward pressure of the wash water. Also, due to the presence of the separate bottom in this self-contained unit, the downward pressure of the wash water thereon is at least equal to the upward pressure on the porous plates, and since the water has an opportunity to pass through the porous plates, the upward pressure thereon is somewhat relieved, so that the downward water pressure on the unit bottom will more than counteract the upward pressure on the porous plates.

A further object is to provide a slightly modified form of filter construction wherein the reservoir or lower chamber comprises a bottom and two side walls which are separate from the regular tank bottom and side walls, while utilizing the front and rear walls of the regular tank, to thereby provide substantially an equivalent of a self-contained unit.

A further object is to provide novel means for securing the porous plates to the supporting blocks so that they may be quickly and easily set and held in position to provide an integral porous partition between the upper and lower chambers.

Other objects and advantages will become apparent from the following description taken in conjunction with the accompanying drawings.

Figures 5, 9:
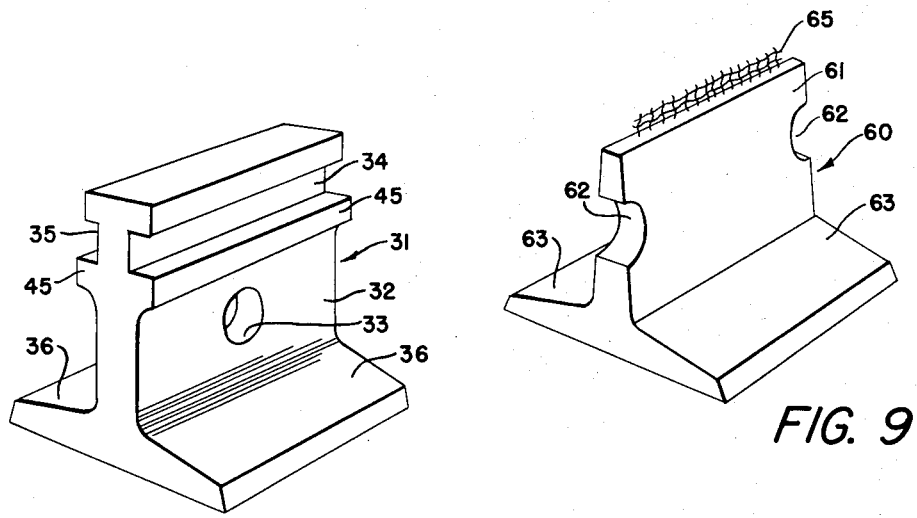
Figure 2:
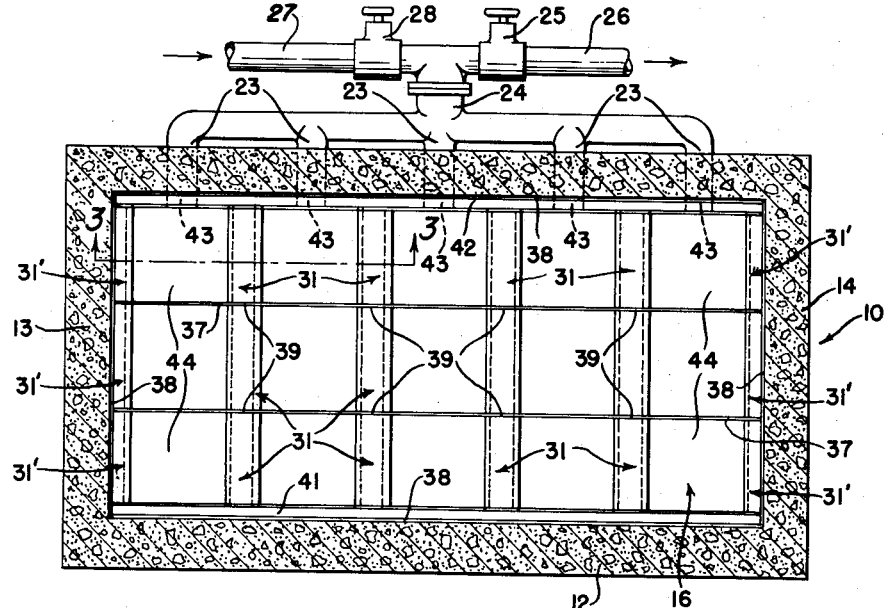
Figure 8:
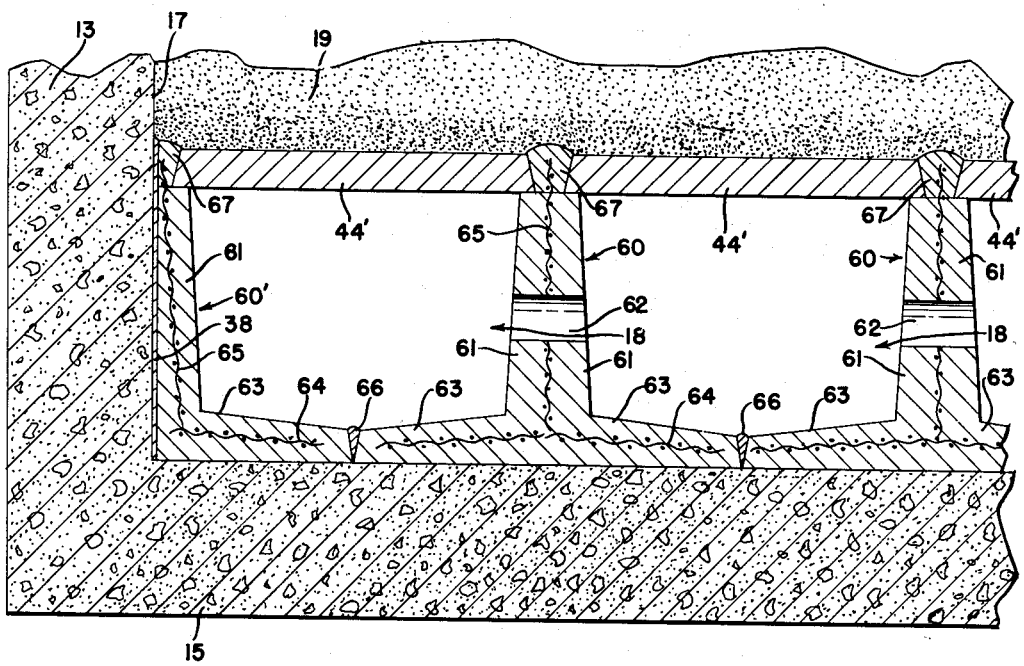
Figure 3:
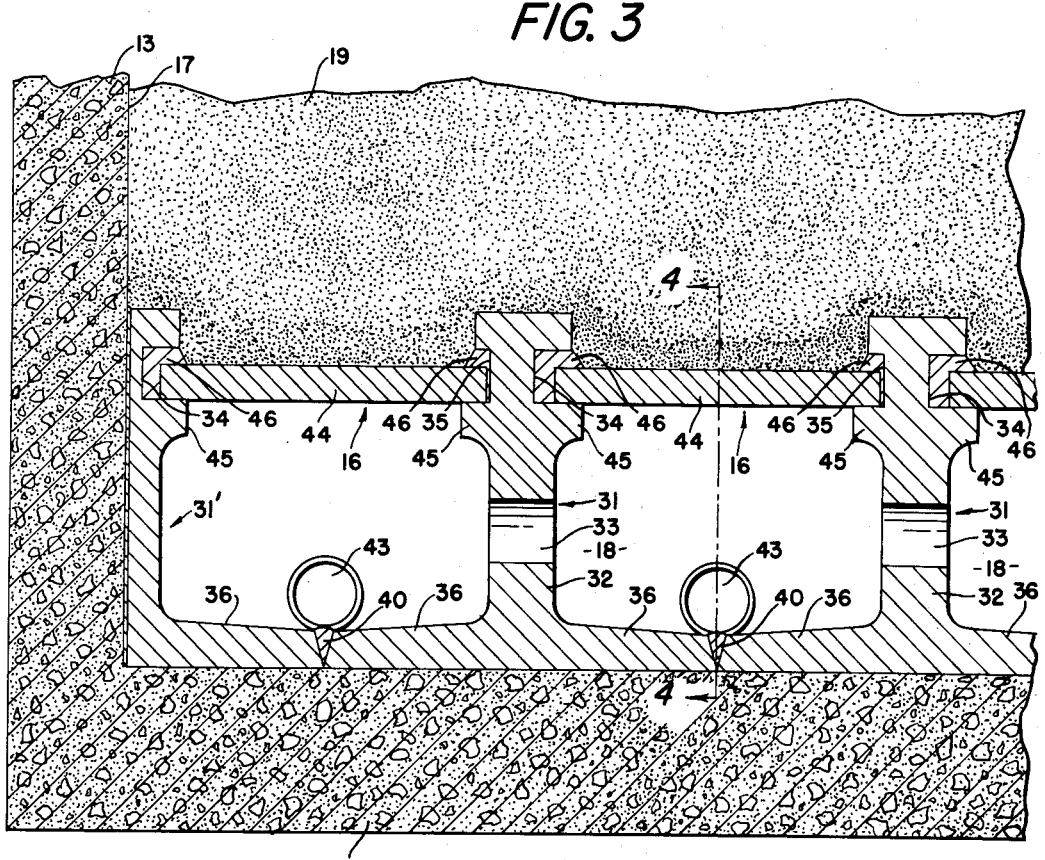
Figure 4:
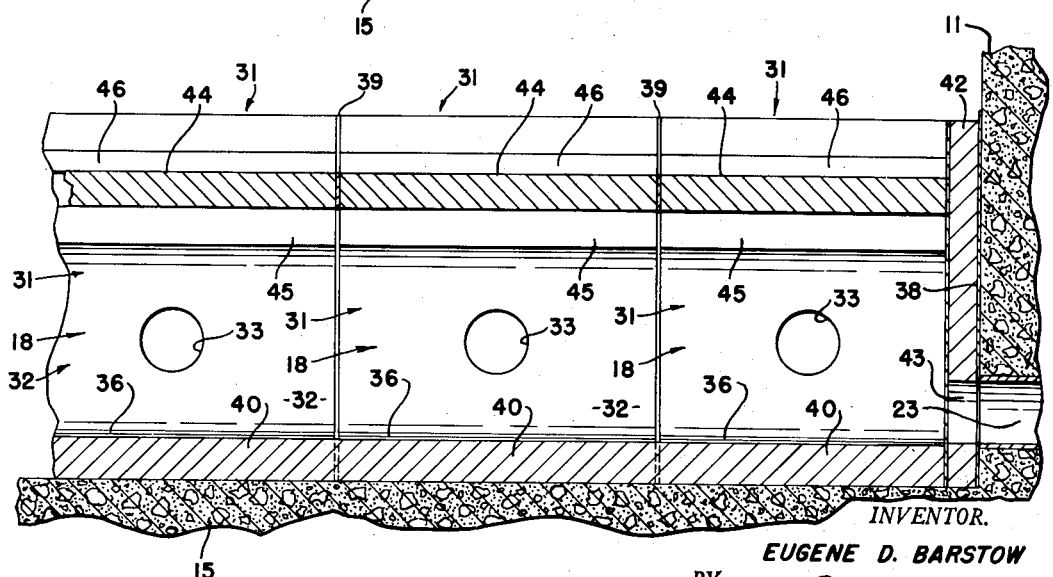
Figure 6:
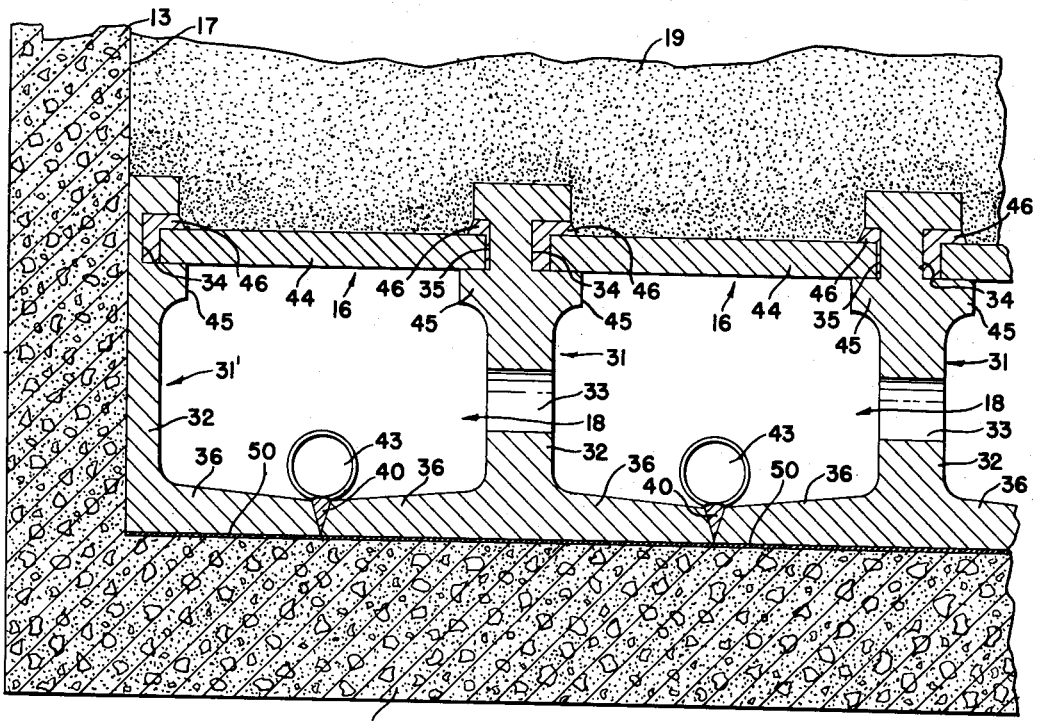
Figure 7:
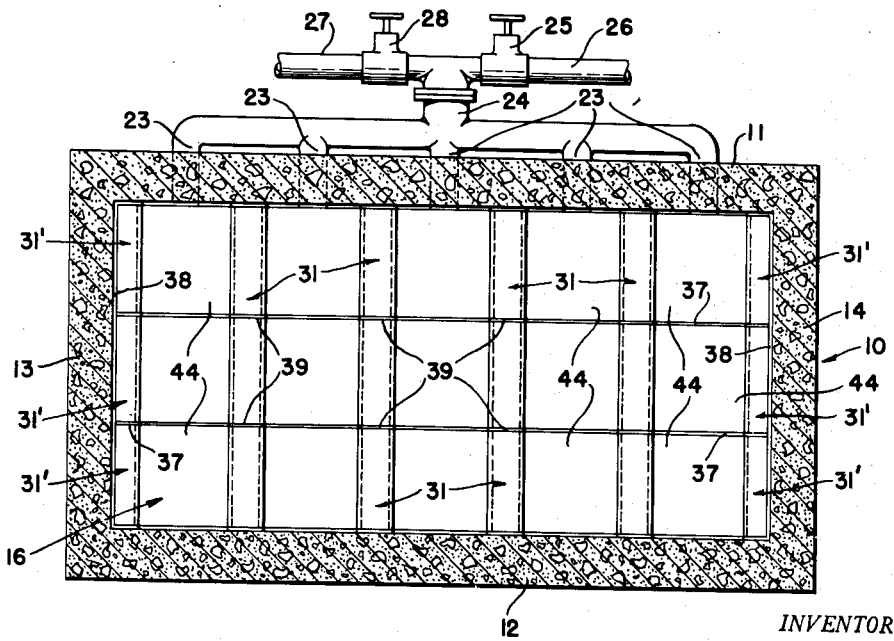

In the drawings:

Fig. 1 is a vertical section through a filtration tank embodying my invention, and showing grout or other means filling the spaces between the walls of the regular tank and the walls of the reservoir unit in order to keep water from getting beneath the bottom of the reservoir unit, Fig. 2 is a horizontal section through the tank, taken substantially on line 2—2 of Fig. 1 and turned approximately 90°, Fig. 3 is an enlarged fragmentary section taken substantially on line 3—3 of Fig. 2, Fig. 4 is a similar section taken substantially on line 4—4 of Fig. 3, Fig. 5 is a perspective view of one form of supporting block for the porous plates, Fig. 6 is a section similar to Fig. 3 with grout or other means filling the space between the regular bottom of the tank and the bottom of the reservoir chamber in order to prevent water from getting beneath the latter bottom, Fig. 7 is a section similar to Fig. 2 showing a modification wherein the regular front and rear walls of the tank are utilized with separate side walls and a separate bottom in forming the reservoir chamber, Fig. 8 is a section similar to Fig. 3 showing a modified form of supporting block for the porous plates, and Fig. 9 is a perspective view of one of the supporting blocks of Fig. 8.

Referring to the drawings, the numeral 10 designates a water filtration tank as a whole, which is formed of concrete or other suitable material and which may be of any desired size and shape depending on the job for which it is to be used. In this instance the tank 10 is preferably rectangular and comprises front and rear walls 11 and 12, side walls 13 and 14, and a bottom 15 to which the walls are integrally united.

Near the bottom of the tank a horizontal partition, indicated as a whole by the numeral 16, is arranged, which is composed of a plurality of relatively small porous plates suitably joined to form an integral partition, and which separates the tank into an upper relatively large filter chamber 17 and a lower relatively small reservoir chamber 18. The porous partition 16 supports a relatively deep filter bed 19 consisting of relatively fine, granular material, such as a quartz sand, which will permit liquids to be filtered to flow therethrough, but will prevent the passage of solid matter through the filter bed. The porosity of the plates which form the partition 16 is such that the rate of filtration is not impeded, yet the pores are small enough to prevent the grains of the filtering medium from entering the plates and interfering with the flow of fluid therethrough.

The liquid to be filtered may enter the tank 10 through a conventional open distributing pipe 20 located near the top of the tank, and a valve 21 located in a supply line 22 controls the passage of this liquid. After the filtered liquid has reached the reservoir chamber 18 it leaves the latter through branch pipes 23 connected with a manifold 24, from which it passes under control of valve 25 through pipe 26 to any desired location.

When wash water is to be run through the tank in order to wash sediment or foreign matter from the grains of the filtering medium, valve 21 is closed, filtered water is drained from the tank preferably until it reaches approximately the upper level of the filter bed, and valve 25 is thereafter closed. Wash water is then permitted to enter the tank through a supply pipe 27, in which is located control valve 28, through manifold 24 and pipes 23 into the reservoir chamber 18. As the wash water and sediment from the filtering medium rise to the level of the open pipe 20, they leave the tank through pipe 29 in which is located the control valve 30.

The foregoing elements are substantially standard in present day filtration apparatus and form no part of the present invention except as they function in combination with the improvements in this art that will now be referred to.

Referring to Figs. 1 to 5, the reservoir chamber 18 is in effect a self-contained unit, having a bottom and four side walls which are separate and distinct from the bottom and walls of the tank 10, and this unit is formed in the tank 10 in the following manner. First, a plurality of concrete or vitrified clay blocks, indicated as a whole by the numeral 31 (see Fig. 5) are assembled for use in forming the bottom of the self-contained unit and for supporting the porous filter plates. Each block 31 is preferably about 9 inches in height and about 12 inches in width at its base. As shown, each block 31 has a vertical body portion 32 with a transverse opening 33 therein, and one side face near its upper end has a large cut out area 34 formed longitudinally therein, while the opposite side face is formed with a smaller cut out area 35. Integral flanges 36 form the base of the block. Half blocks 31', similar to those shown at the left in Figs. 3 and 6, are also provided for use adjacent the side walls of the tank, and these half blocks also have one flange 36 and either cut out area 34 or 35, depending upon which half of the block is being used.

To construct the self-contained reservoir unit, a plurality of half blocks 31' are first arranged in end-to-end relation across one side of the tank, for example, adjacent side wall 13 as indicated in Figs. 2 and 3, with flange 36 in contact with the bottom of the tank. The end faces of the half blocks are joined by a thin layer of cement 37, while the flat vertical faces of the half blocks (as viewed in Fig. 3) are spaced slightly from the wall 13, and these spaces are filled with a thin layer of grout 38, not essentially to secure the half blocks to wall 13, but to prevent the entrance of liquid between wall 13 and the new wall formed by the end-to-end half blocks, which liquid might find its way beneath the reservoir unit.

After the first row of half blocks 31' is in position, a row of blocks 31 is set adjacent the first row in end-to-end relation and the end faces of these blocks are also joined by a thin layer of cement 39. Flanges 36 on the row of blocks 31 rest on the bottom of the tank, and one flange of each block (the left flange 36 as viewed in Fig. 3) lies adjacent the flanges on the row of half blocks, so that the adjacent flanges in each row can be securely joined together by a suitable layer of mortar 40. It will be noted that adjacent edges of the respective flanges are tapered to increase the space between the flanges so that an adequate supply of mortar can be used to join the adjacent rows of flanges.

Subsequent rows of blocks 31 are now laid in the same manner as the first row, until the bottom of the tank is covered except for a small space adjacent side wall 14, with all adjacent end faces of the blocks being joined by thin layers of cement 39, and all adjacent flanges 36 being joined by a larger layer of mortar 40. A final row of half blocks 31' is now laid in the space adjacent side wall 14 with their base flanges properly cemented to the base flanges of the adjacent row of blocks 31, and with their end faces united by thin layers of cement 37. A relatively small space is left between side wall 14 of the tank and the vertical side faces of the half blocks 31', which space is also filled with a thin layer of grout 38 in order to prevent passage of liquid between wall 14 and the new wall formed by the second row of half blocks 31', which liquid might find its way under the new bottom which now has been formed by the united base flanges 36 of the various blocks and half blocks.

Either before, during or after the laying of the rows of blocks and half blocks, a separate rear wall 41 is erected adjacent the rear wall 12 of the tank and a small space between walls 12 and 41 is filled with grout 38 to prevent liquid from passing between these walls and beneath the new bottom formed by flanges 36. The end faces of the blocks and half blocks which are adjacent wall 41 are properly cemented thereto, as will be understood.

Similarly, a separate front wall 42 is erected adjacent the front wall 11 of the tank, with the small space between these walls also being filled with a layer of grout 38 to prevent leakage of liquid therebetween. The end faces of the blocks and half blocks adjacent wall 42 are also properly cemented to the latter wall, and openings 43 are formed in wall 42 in alignment with branch pipes 23 whereby filtered water may leave the reservoir chamber and wash water may be permitted to enter the latter chamber. The openings 33 in blocks 31 may be of any reasonable size and it will be observed that these openings amply permit water to circulate through the entire reservoir chamber.

It will now be seen that a self-contained reservoir chamber has been provided within the tank 10 which comprises a bottom formed by the united base flanges on the various blocks and half blocks, side walls formed at each side by the two rows of half blocks, and rear and front walls 41 and 42, respectively.

We come now to the porous partition 16 and the manner in which the porous filter plates 44 are joined to the blocks and half blocks to form this partition. These plates may be made of any suitable materials that will produce the desired strength and porosity. A suitable plate is available on the market under the name "Aloxite," which is made from grains of fused crystalline aluminum oxide held together with ceramic binders. These plates are substantially uniform in size and are usually of square configuration. As will be readily noted from Fig. 3, the plates 44 are shorter or of less width than the distance from the inner face of the cut out area 34 on one block 31 or half block 31' to the inner face of the cut out area 35 on the next adjacent block or half block. This permits the left end (as viewed in Fig. 3) of each plate 44 to be initially tilted at a slight angle and inserted in the large cut out area 34 of a block or half block until it contacts the inner face of area 34, which action allows the right end of the plate to clear the upper edge of the adjacent block and be inserted into the smaller cut out area 35 of the latter block. Each plate 44 is then moved to the right to a position nearly touching the inner face of cut out area 35, until it assumes approximately the position shown in Fig. 3 resting on the ledges 45 of the blocks and half blocks, after which the spaces around both ends of the plates are filled with mortar 46 to securely hold the plates to the blocks and half blocks. Adjacent edges of the plates 44 are suitably joined by cement and the edges of the plates adjacent rear and front walls 41 and 42 are suitably cemented to these walls, whereby the partition 16 becomes in effect an integral porous structure which is supported on the blocks and half blocks, and which in turn supports the filter bed 19.

With the arrangement described, water to be filtered may readily flow by gravity through the apparatus to a suitable distributing system. When wash water is admitted under pressure to the self-contained reservoir chamber to clean the grains of the filter medium, the downward pressure of the water against the separate bottom of the self-contained unit is at least equal to the upward pressure of the water against the porous plates, and since the water has an opportunity to pass through the porous plates, the downward water pressure against the bottom of the self-contained unit will more than counteract the upward pressure against the plates. Thus, with my arrangement it is no longer necessary to furnish the strong anchoring means for the porous plates that was heretofore provided by numerous bolts, rods, nuts, etc. The integral supporting blocks and half blocks are more than strong enough to carry the porous plates and the filter bed thereon, while the provision of a separate bottom for the reservoir unit which is formed integral with the plate supporting blocks and half blocks, provides an arrangement which is more than adequate for its intended purpose, which is more economical and practical to build and maintain than previous construction, and in which there is less likelihood of plate damage.

It will be observed further that with my arrangement, instead of the wash water pressure having a tendency to pull or tear the porous plates upwardly away from their supporting and anchoring blocks, any tendency for the plates to move upwardly would tend to move the integral blocks upwardly, which in turn would tend to move the integral bottom upwardly, which would be impossible because the wash water pressure acting against the bottom of the reservoir unit is at least as great and probably greater than the water pressure acting against the plates.

In my arrangement it is important that wash water under pressure does not get between the reservoir bottom and the tank bottom, since such water might have a tendency to raise a portion of the reservoir unit. Another feature of my arrangement is that while the self-contained reservoir unit can readily be made of concrete, the manner of handling the wash water under pressure makes it possible to form the unit from vitrefied clay blocks and half blocks.

In Fig. 6 I have shown a modified arrangement wherein the self-contained reservoir unit is formed in substantially the same manner as the unit in Figs. 1 to 5, except that instead of using a thin layer of grout to fill the spaces between the walls 13 and 14 of the tank and the rows of half blocks 31', the latter rows are set as close as possible to the side walls 13 and 14, and a thin layer of grout 50 is used to fill the space between the tank bottom and the united flanges 36 of the blocks and half blocks. This layer of grout 50 will also prevent liquid from getting between the reservoir bottom and the tank bottom. It is believed to be obvious that side layers of grout 38 and a bottom layer 50 could both be utilized in the same structure if desired.

Fig. 7 shows a modified arrangement which is similar to the reservoir chamber construction of Figs. 1 to 5, except that the rear and front walls 41 and 42, respectively, are omitted from the Fig. 7 construction. In other words, the rows of blocks 31 and half blocks 31' are laid out and joined together so that a separate bottom for the reservoir chamber is formed by the base flanges of the blocks and half blocks, separate side walls adjacent tank walls 13 and 14 are formed by the two rows of half blocks 31', and the porous plates are properly cemented to each other and to the blocks and half blocks to provide the integral porous partition 16, but instead of the end faces of the blocks, half blocks and porous plates adjacent front and rear walls 11 and 12 being secured to separate walls (such as 41 and 42) these end faces are properly cemented directly to the tank walls 11 and 12, respectively. This Fig. 7 arrangement provides substantially all of the features of the self-contained reservoir unit arrangement, and is the full equivalent of the latter arrangement.

In Figs. 8 and 9, I have shown a modified form of block and half block for supporting the porous plates 44' and forming an integral porous partition similar to partition 16. This type of block (see Fig. 9) is indicated as a whole by the numeral 60 and comprises a tapered body portion 61 having elliptical openings 62 formed in the end faces of the body portion, and integral base flanges 63, similar to flanges 36. Embedded in the base flanges 63 is a metal mesh reinforcement 64, a portion 65 of which extends upwardly through the body portion 61 and projects beyond the top thereof. A half block 60' is shown at the left of Fig. 8 and constitutes substantially one half of block 60, while omitting any elliptical openings.

The blocks 60 and half blocks 60' are laid in rows in end-to-end relation and joined together with the flanges 63 being united by mortar 66 to form a reservoir bottom separate from the tank bottom, so as to provide a self-contained reservoir unit similar to that shown in Figs. 1 to 5, except for the difference in the shape and structure of the blocks and half blocks. However, when the blocks 60 and half blocks 60' are used, the porous plates 44' are merely laid on top of the blocks and half blocks, as indicated in Fig. 8, and adjacent side edges of the plates are oppositely tapered whereby the space between the plates may be filled with mortar 67 which upon hardening will also be reinforced by the mesh reinforcement 65. Adjacent meeting edges of the plates 44' will, of course, be joined by cement in the usual manner, so that the partition will correspond in all respects to the partition 16, except for the difference in the means for securing the respective plates to the blocks and half blocks.

While I have shown and described preferred embodiments of my invention, it will be understood that the invention is not limited to such embodiments, and that modifications and changes may be made therein without departing from the spirit of the invention or from the scope of the subjoined claims.

What is claimed is:

1. In filtration apparatus comprising a tank rectangular in cross-section and divided into an upper filter chamber and a lower reservoir chamber, which chambers are separated by a plurality of porous plates integrally joined to form a partition which supports filter media adapted to filter water passing downwardly therethrough and to be cleaned by backwash water passing upwardly therethrough, said reservoir chamber comprising a rectangular shaped self-contained unit formed with a bottom and all four of its side walls integral with said bottom, said backwash water being admitted to said reservoir chamber above said bottom, said bottom and side walls of said unit being formed separately from the bottom and side walls of said tank but being arranged in said tank in a manner to prevent any of said water from getting between said tank bottom and said reservoir chamber bottom, and supporting means for said porous plates integral with said unit bottom and extending completely across said reservoir chamber, said supporting means being secured to two opposite side faces of said plates co-extensive with the area of said faces, and constituting the sole means for anchoring said plates against backwash pressure.

2. In filtration apparatus comprising a tank rectangular in cross-section and divided into an upper filter chamber and a lower reservoir chamber, which chambers are separated by a plurality of porous plates integrally joined to form a partition which supports filter media adapted to filter water passing downwardly therethrough and to be cleaned by backwash water passing upwardly therethrough, means forming said reservoir chamber comprising a plurality of blocks having a vertical body portion provided with a transverse opening therethrough and having lateral base flanges, the base flanges of the blocks being integrally joined to provide a bottom for the reservoir chamber separate from the tank bottom, said backwash water being admitted to said reservoir chamber above said bottom of said reservoir chamber, and the end faces of said body portions being integrally joined to provide continuous supports for said porous plates extending completely across said reservoir chamber, said vertical body portions of said blocks constituting the sole means for anchoring said plates against backwash pressure.

3. In filtration apparatus, for municipal and industrial water plants, of the type requiring gravity-operated filtering and pressure-operated backwashing equipment providing for relatively long periods of continuous filtering punctuated by periodic backwashing without removing the filter media from its bed, said apparatus comprising a tank rectangular in cross-section and divided into a single upper chamber and a lower reservoir chamber consisting of multiple filtrate and washwater conduits, said chambers being separated by a plurality of porous plates integrally joined to form a partition which supports filter media, each of said conduits being a self contained unit formed of a bottom and at least two side walls integral with the bottom, each said unit being separate and distinct from the bottom and side walls of said tank but being arranged in said tank in a manner to prevent any of said water from getting between said tank bottom and said conduit bottom, the backwash water being admitted to said reservoir chamber above said bottom of each said unit, said side walls of each said unit constituting means for supporting said plates during filtering operations and constituting the sole means for anchoring said plates against backwash pressure during backwashing operations.

4. In filtration apparatus comprising a tank rectangular in cross-section and divided into an upper filter chamber and a lower reservoir chamber, which chambers are separated by a plurality of porous plates integrally joined to form a partition which supports filter media adapted to filter water passing downwardly therethrough and to be cleaned by backwash water passing upwardly therethrough, said reservoir chamber comprising a bottom and at least two side walls integral with said bottom, said backwash water being admitted to said reservoir above said bottom, said bottom and side walls being formed separately from the bottom and side walls of said tank but being arranged in said tank in a manner to prevent any of said water from getting between said tank bottom and said reservoir chamber bottom, and supporting means for said porous plates integral with said reservoir chamber bottom and extending completely across said reservoir chamber, said supporting means being secured to two opposite side faces of said plates co-extensive with the area of said faces and constituting the sole means for anchoring said plates against backwash pressure.

5. In filtration apparatus comprising a tank rectangular in cross-section and divided into an upper filter chamber and a lower reservoir chamber, which chambers are separated by a plurality of porous plates integrally joined to form a partition which supports filter media adapted to filter water passing downwardly therethrough and to be cleaned by backwash water passing upwardly therethrough, an integral bottom for said reservoir chamber formed separately from the bottom of said tank but being arranged in said tank in a manner to prevent any of said water from getting between said tank bottom and said reservoir chamber bottom, said backwash water being admitted to said reservoir chamber above said bottom of said reservoir chamber, and supporting means for said porous plates integral with said reservoir chamber bottom and extending completely across said reservoir chamber, said supporting means being secured to two opposite side faces of said plates co-extensive with the area of said faces and constituting the sole means for anchoring said plates against backwash pressure.

References Cited in the file of this patent

UNITED STATES PATENTS

| Number | Name | Date |
|---|---|---|
| Re. 23,009 | Camp | June 29, 1948 |
| 730,518 | Davis | June 9, 1903 |
| 773,946 | Langill | Nov. 1, 1904 |
| 1,060,870 | Wiley | May 6, 1913 |
| 1,077,619 | Maranville | Nov. 4, 1913 |
| 1,277,832 | Beckley | Sept. 3, 1918 |
| 1,584,142 | Rawn | May 11, 1926 |
| 2,043,734 | Camp | June 9, 1936 |
| 2,086,763 | Bradford | July 13, 1937 |
| 2,359,985 | Gordon | Oct. 10, 1944 |
| 2,378,239 | Myron | June 12, 1945 |
| 2,453,405 | Bolser | Nov. 9, 1948 |
| 2,499,325 | Miller | Feb. 28, 1950 |

FOREIGN PATENTS

| Number | Country | Date |
|---|---|---|
| 5,850 | Great Britain | of 1906 |
| 13,947 | Great Britain | of 1905 |
| 16,232 | Great Britain | of 1912 |